March 31, 1959  F. E. McKINLEY  2,879,753
WATER INJECTION APPARATUS
Filed March 12, 1957
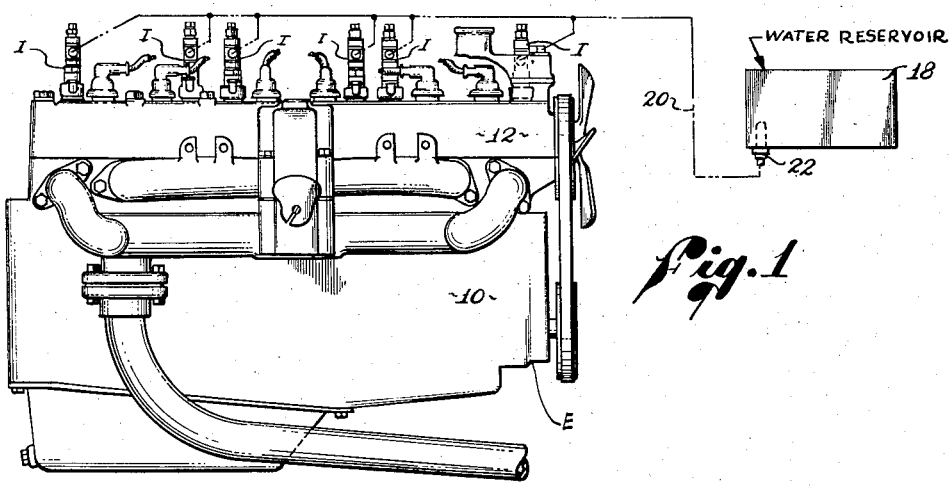
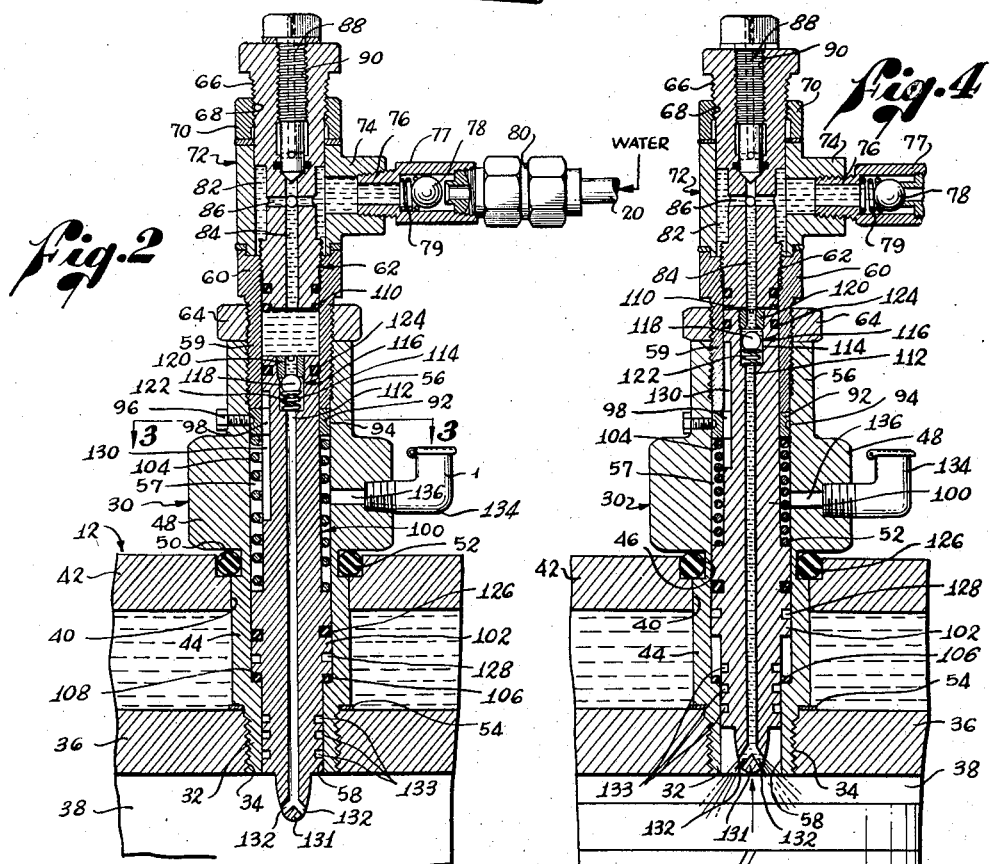
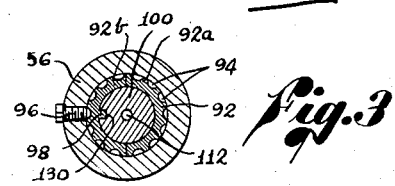
INVENTOR.
FRED E. McKINLEY
BY Fulwider Mattingly & Huntley
Attorneys United States Patent Office 2,879,753
Patented Mar. 31, 1959

2,879,753

WATER INJECTION APPARATUS

Fred E. McKinley, Paramount, Calif.

Application March 12, 1957, Serial No. 645,486

19 Claims. (Cl. 123—25)

The present invention relates generally to internal combustion engines and more particularly to a novel and improved water injection apparatus for use therewith.

It is well known that the unburned vapor contaminants exhausted from internal combustion engines of automotive vehicles constitute a prime source of the atmospheric pollution which exists in and around the principal population centers of the country. The harmful and disagreeable effects of such atmospheric pollution are likewise very well known. It is a primary object of the present invention to provide water injection apparatus which by introducing a charge of water into the combustion chambers of an internal combustion engine will effect a more thorough and complete burning of the hydrocarbons taken into these combustion chambers. The result of this more complete and thorough burning is an appreciable reduction of the amount of unburned contaminants exhausted from the engine. Additionally, the amount of work produced by the engine's for a given unit of fuel will be increased whereby a reduction in fuel consumption is accomplished. A further advantage afforded by this water injection apparatus is a reduction in the operating temperature of the engine whereby the parts of the engine will operate with less wear than is presently the case.

Another object of the present invention is to provide water injection apparatus which automatically releases a charge of water into the combustion chambers of the engine in response to the explosion pressures thereof.

A further object is to provide water injection apparatus of the aforedescribed nature which is simple in design and rugged of construction whereby it may afford a long and trouble-free service life.

Yet another object is to provide water injection apparatus of the aforedescribed nature which may be readily installed upon existing internal combustion engines without requiring extensive modification thereof. Alternatively, it may be incorporated into original equipment.

An additional object of the invention is to provide water injection apparatus of the aforedescribed nature which requires a minimum of maintenance after it has been installed.

Another object is to provide water injection apparatus which may be manufactured at a comparatively low cost whereby it may find a wide market.

A more particular object of the invention is to provide water injection apparatus which affords a directional flow of water to a desired location within the engine's combustion chambers.

Another important object of the present invention is to provide water injection apparatus having a charge-forming piston which extends through a lubricant chamber and which is isolated from such lubricant chamber by sealing means in such a manner that failure of such sealing means will become immediately apparent.

Yet an additional object is to provide water injection apparatus having special means for preventing leakage of water into the engine's combustion chambers.

These and other objects and advantages of the present invention will become apparent from the following detailed description of a preferred embodiment thereof, when taken in conjunction with the appended drawings wherein:

Figure 1 is a side elevational view of an internal combustion engine provided with water injection apparatus embodying the present invention;

Figure 2 is an enlarged central vertical sectional view of one of the injector members of said apparatus;

Figure 3 is a horizontal sectional view taken on line 3—3 of Figure 2; and

Figure 4 is a view similar to Figure 2 showing the parts of said injector member during an explosion within the engine's combustion chamber.

Referring to the drawings, the preferred form of water injection apparatus embodying the present invention is shown in conjunction with a conventional internal combustion engine E having a block 10 and a detachable water jacket 12. The apparatus includes a plurality of identical injection members I corresponding to the number of cylinders of the engine. Each injector I is mounted adjacent one of the engine's cylinders and is adapted to inject a charge of water or other liquid into the combustion chamber of the cylinder. The water is supplied to the injectors I from suitable source, such as a reservoir tank 18. The reservoir tank 18 is connected to each injector I by piping 20 and preferably a strainer 22 will be disposed over the tank's outlet.

More particularly, and referring to Figure 2, each of the injectors I are of identical construction and include an integral body, generally designated 30. The lower end of the body 30 is formed with an externally threaded base 32 adapted to be threadably engaged with a threaded bore 34 formed through the upper wall 36 of an engine cylinder in communication with the combustion chambers 38 of such cylinder. A second bore 40 is formed in the upper wall 42 of the water jacket 12 coaxial with the threaded bore 34. Above the base 32 the body 30 is formed with a coaxial cylindrical portion 44 that extends upwardly between the cylinder's upper wall 36 and the water jacket's upper wall 42. The body 30 is formed with a coaxial, enlarged wrench-receiving portion 48 of polygonal horizontal cross-section above the cylindrical portion 46. An annular recess 50 is formed in the upper end of the cylindrical portion 46 for receiving a sealing means, such as an O-ring 52. A flat sealing ring 54 is interposed between the underside of the body's cylindrical portion 46 and the upper surface of the cylinder's upper wall 36. Above its wrench-receiving portion 48, the body is formed with a cylindrical neck 56. The body 30 is also formed with an axially extending cavity 57 which extends through its neck 56, wrench-receiving portion 48 and cylindrical portion 46. The lower end of this cavity 57 merges into a coaxial bore 58 that extends downwardly through the base 32.

The neck 56 of the body 30 is internally threaded to receive an externally threaded spring-adjustment sleeve 59. The upper portion of the spring-adjustment sleeve 59 is formed with a radially outwardly extending collar 60. A lock nut 64 encircles the spring adjustment sleeve 59 below this collar so as to affix it to the body 30. The upper portion of the spring-adjustment sleeve 59 is internally threaded to receive the lower portion of a stroke-adjustment post, generally designated 62. The upper portion of the stroke-adjustment post 62 is formed with external threads 66. These threads 66 are engaged with complementary internal threads formed within the bore 68 of a cap member 70. A water-receiving tube, generally designated 72, is interposed between the underside of the cap 70 and the upper end of the spring-adjustment sleeve 59. The water-receiving tube 72 is formed with a radially extending elbow 74 that threadably receives the nipple element 76 of an inwardly-opening check valve 77. The check valve 77 includes a ball element 78 that is biased away from the water-receiving tubes elbow 74 by a coil compression spring 79. This check valve 77 is connected to the water piping 20 by means of a suitable connector fitting 80.

The intermediate portion of the stroke-adjustment post 62 is formed with an annular recess 82. This recess 82 is in communication with an axially extending coaxial passage 84 formed through the lower portion of the stroke-adjustment post by a plurality of radially extending ports 86. The upper end of the passage 84 is closed by the lower end of a bleeder screw 88. This bleeder screw 88 is carried within a coaxial internally threaded bore 90 formed through the upper portion of the stroke adjustment post 62.

An alignment ring 92 is disposed within the body cavity 57 immediately below the spring adjustment sleeve 59. This alignment ring 92 is of split construction having two halves, designated 92a and 92b, as indicated in Figure 3, in order to facilitate its assembly. The peripheral portion of the alignment ring 92 is formed with a plurality of depressions 94 adapted to receive the tip of a set screw 96 which extends through the neck 56 of the body 30. The segment 92b of the alignment ring is formed with a radially inwardly extending key 98 for a purpose to be set forth hereinafter.

A charge-forming piston, generally designated 100, is slidably disposed within the body cavity 57 for vertical reciprocation therewithin. The intermediate portion of this piston 100 is formed with a radial enlargment 102. A coil compression spring 104 encircles the piston 100 above the radial enlargement 102 and is interposed between the underside of the adjustment ring 92 and the upper surface of this enlargement. This spring 104 constantly biases the piston 100 downwardly towards its position of Figure 2. A lower washer 106 formed of a suitable impact-absorbing material (such as rubber) is positioned upon the shoulder 108 formed at the juncture of the body's cavity 57 and its bore 58. A similar upper washer 110 is positioned at the underside of the stroke-adjustment post 62. The piston 100 is formed with an axially extending passage 112, the upper end of which merges into a coaxial enlargement 114 that houses a downwardly opening check valve 116. This check valve 116 includes a ball element 118 which is constantly biased upwardly against an externally threaded sleeve 120 by a coil compression spring 122. A suitable seal, such as a rubber O-ring 124, is carried by the upper end of the piston 100 outwardly of the check valve 116. A second rubber O-ring 126 is carried by the radial enlargement 102. An annular heat stop-groove 128 is formed in the radial enlargement 102 below the lower O-ring 126. The intermediate portion of the piston 100 is formed with an axially extending keyway 130 that slidably receives the key 98 of the alignment ring 92. The lower end of the piston 100 is formed with a depending directional nozzle 131. This nozzle is formed with one or more orifices 132 connected to the lower end of the passage 112 and arranged to direct fluid entering the nozzle through the passage 112 towards one or more desired areas of the combustion chamber 38 in a manner to be fully described hereinafter. The lower portion of the piston 100 below the radial enlargement 102 is formed with a plurality of heat stop-grooves 133.

The portion of the body cavity 57 below the alignment ring 92 is adapted to receive lubricant, such as oil, through a cup-fitting 134, this fitting being threaded into the wrench-receiving portion 48 of the body. A radially extending passage 136 interconnects the fitting 134 and the cavity 57.

In the operation of the aforedescribed injection apparatus each of the injectors I function alike, thus as each injector is installed in the engine E the charge forming piston 100 will first be rotated to the position required for the directional nozzles 131 to force water towards the desired portion of the combustion chamber 38. In general, this portion will be that which exists at the highest temperature during engine operation. To permit such piston rotation, the set screw 96 will initially be retracted from the recesses 94 of the alignment ring 92. After the piston is properly aligned, the set screw 96 will be tightened. Next, with the bleed screws 88 withdrawn from the cavities 90 of each injector I, the upper portion of the injectors will be filled with water. At this time each of the charge-forming pistons 100 will be maintained in their lower position of Figure 2 under the influence of the compression springs 104. The portion of the body cavity 57 of each of the injectors surrounding the springs 104 should be fully or partially filled with a lubricant by means of the fittings 134.

Referring now to Figure 4, during operation of the engine, the charge-forming piston 100 of each injector I will be forced upwardly against the downward pressure of its spring 104 during each explosion within the combustion chamber 38. Such upward movement of the charge-forming piston will forceably inject a charge of water through the directional nozzle 130 towards the desired portion of the combustion chamber, the ball 118 of the lower check valve 114 opening to permit the flow of water downwardly through the piston's passage 112. The ball 78 of the upper check valve 77 will at this time be forceably seated by the increase in pressure of the water within the upper portion of the injector caused by such upward movement of the charge-forming piston. The introduction of this water within the combustion chamber will serve to effect a more thorough and complete burning of the fuel exploded therewithin. As the charge-forming piston 100 is moved downwardly by the spring 104 after the explosion, the lower check valve 114 will be closed so as to draw a fresh charge of water inwardly through the upper check valve 78. Preferably, the lower portion of the charge-forming piston 100 will have a comparatively loose fit within the body bore 58. With this arrangement, the space below the underside of the piston's radial enlargement 102 will be properly vented during piston reciprocation.

It should be particularly noted that the heat stop-grooves 133 and 128 formed in the lower portion of the charge-forming piston 100 serve to reduce the temperature of the piston. These grooves will generally become filled with carbon after continued operation of the engine, however, their effectiveness will not thereby be appreciably reduced. It should also be noted that the positioning of the cylindrical portion 44 of the body 30 within the confines of the water jacket 12 affords maximum cooling for the lower portion of this body. If after continued use, the lower O-ring 126 should become worn or damaged this fact will immediately become apparent by the outward bubbling of the lubricant contained within the body cavity 57 through the fitting 134. Upon such occurrence the O-ring may be readily replaced. It should likewise be noted that the utilization of the inwardly-opening upper check valve 78 will prevent flooding of the engine's combustion chambers with water should the lower check valve 114 fail to close during the time the engine is inoperative, or should the lower O-ring 125 become too worn to retain water.

While there has been shown and described hereinbefore what is presently considered to be the preferred embodiment of the present invention, it will be apparent that various modifications and changes may be made thereto without departing from the spirit of the invention or the scope of the following claims.

I claim:

1. Injection apparatus for injecting a fluid into the combustion chamber of an internal combustion engine, comprising: conduit means for said fluid; an injector body securable to said engine, said body being formed with a bore that extends away from said combustion chamber that merges into a coaxial cavity of larger diameter; a charge-forming piston reciprocally arranged within said cavity and bore so as to be urged away from said combustion chamber by an explosion therein with the intermediate portion of said piston having a radial enlargement disposed in said cavity, said piston being formed with a passage through which fluid passes from said cavity to said combustion chamber; spring means interposed between said body and said radial enlargement constantly biasing said piston towards said combustion chamber with the underside of said radial enlargement abutting the radial shoulder defined between said bore and said cavity; impact absorbing material interposed between the underside of said radial enlargement and said radial shoulder; a fluid receiving member on said body connected to said conduit means so as to admit said fluid to said cavity; a first check valve on said piston that opens towards said combustion chamber so as to block flow through said passage except while said piston is moving away from said combustion chamber; and a second check valve interposed between said fluid-receiving member and said body and opening towards said cavity, said second check valve being biased towards a closed position so as to block flow into said cavity except while said piston is moving towards said combustion chamber.

2. Injection apparatus for injecting a fluid into the combustion chamber of an internal combustion engine, comprising: conduit means for said fluid; and injector body securable to said engine, said body being formed with a bore that extends away from said combustion chamber that merges into a coaxial cavity of larger diameter; a charge-forming piston reciprocally arranged within said cavity and bore so as to be urged away from said combustion chamber by an explosion therein with the intermediate portion of said piston having a radial enlargement disposed in said cavity, said piston being formed with a passage through which fluid passages from said cavity to said combustion chamber; spring means interposed between said body and said radial enlargement constantly biasing said piston towards said combustion chamber with the underside of said radial enlargement abutting the radial shoulder defined between said bore and said cavity; a spring adjustment member on said body and extending into said cavity so as to abut said spring, said spring adjustment member being movable towards and away from said spring so as to vary the effective strength thereof, with the space between said spring adjustment member and said shoulder constituting a lubricant chamber; means on said body for introducing a lubricant into said lubricant chamber; a fluid-receiving member on said body connected to said conduit means so as to admit said fluid to said cavity; a first check valve on said piston that opens towards said combustion chamber so as to block flow through said passage except while said piston is moving away from said combustion chamber; and a second check valve interposed between said fluid-receiving member and said body and opening towards said cavity, said second check valve being biased towards a closed position so as to block flow into said cavity except while said piston is moving towards said combustion chamber.

3. Injection apparatus for injecting a fluid into the combustion chamber of an internal combustion engine, comprising: conduit means for said fluid; an injector body securable to said engine, said body being formed with a bore that extends away from said combustion chamber that merges into a coaxial cavity of larger diameter; a charge-forming piston reciprocally arranged within said cavity and bore so as to be urged away from said combustion chamber by an explosion therein with the intermediate portion of said piston having a radial enlargement disposed in said cavity, said piston being formed with a passage through which fluid passes from said cavity to said combustion chamber; spring means interposed between said body and said radial enlargement constantly biasing said piston towards said combustion chamber with the underside of said radial enlargement abutting the radial shoulder defined between said bore and said cavity; a spring adjustment member on said body and extending into said cavity so as to abut said spring, said spring adjustment member being movable towards and away from said spring so as to vary the effective strength thereof, with the space between said spring adjustment member and said shoulder constituting a lubricant chamber; means on said body for introducing a lubricant into said lubricant chamber; impact absorbing material interposed between the underside of said radial enlargement and said radial shoulder; and check valve means that open towards said combustion chamber for restraining flow through said piston passage except while said piston is moving away from said combustion chamber.

4. Injection apparatus for injecting a fluid into the combustion chamber of an internal combustion engine, comprising: conduit means for said fluid; an injector body securable to said engine, said body being formed with a bore that extends away from said combustion chamber that merges into a coaxial cavity of larger diameter; a charge-forming piston reciprocally arranged within said cavity and bore so as to be urged away from said combustion chamber by an explosion therein with the intermediate portion of said piston having a radial enlargement disposed in said cavity, said piston being formed with a passage through which fluid passes from said cavity to said combustion chamber; spring means interposed between said body and said radial enlargement constantly biasing said piston towards said combustion chamber with the underside of said radial enlargement abutting the radial shoulder defined between said bore and said cavity; a spring adjustment member on said body and extending into said cavity so as to abut said spring, said spring adjustment member being movable towards and away from said spring so as to vary the effective strength thereof, with the space between said spring adjustment member and said shoulder constituting a lubricant chamber; means on said body for introducing a lubricant into said lubricant chamber; impact absorbing material interposed between the underside of said radial enlargement and said radial shoulder; a fluid receiving member on said body connected to said conduit means so as to admit said fluid to said cavity; a first check valve on said piston that opens towards said combustion chamber so as to block flow through said passage except while said piston is moving away from said combustion chamber; and a second check valve interposed between said fluid-receiving member and said body and opening towards said cavity, said second check valve being biased towards a closed position so as to block flow into said cavity except while said piston is moving towards said combustion chamber.

5. Injection apparatus for injecting a fluid into the combustion chamber of an internal combustion engine, comprising: conduit means for said fluid; an injector body securable to said engine, said body being formed with a bore that extends away from said combustion chamber that merges into a coaxial cavity of larger diameter; a charge-forming piston reciprocally arranged within said cavity and bore so as to be urged away from said combustion chamber by an explosion therein with the intermediate portion of said piston having a radial enlargement disposed in said cavity, said piston being formed with a passage through which fluid passes from said cavity to said combustion chamber; spring means interposed between said body and said radial enlargement constantly biasing said piston towards said combustion chamber with the underside of said radial enlargement abutting the radial shoulder defined between said bore and said cavity; a spring adjustment member on said body and extending into said cavity so as to abut said spring, said spring adjustment member being movable towards and away from said spring so as to vary the effective strength thereof, with the space between said spring adjustment member and said shoulder constituting a lubricant chamber; means on said body for introducing a lubricant into said lubricant chamber; a stroke adjustment post on said body with its lower end engageable by the upper end of said piston, said post being movable towards and away from said piston so as to adjust the stroke thereof; a fluid-receiving member on said body connected to said conduit means so as to admit said fluid to said cavity; a first check valve on said piston that opens towards said combustion chamber so as to block flow through said passage except while said piston is moving away from said combustion chamber; and a second check valve interposed between said fluid-receiving member and said body and opening towards said cavity, said second check valve being biased towards a closed position so as to block flow into said cavity except while said piston is moving towards said combustion chamber.

6. Injection apparatus for injecting a fluid into the combustion chamber of an internal combustion engine, comprising: conduit means for said fluid; an injector body securable to said engine, said body being formed with a bore that extends away from said combustion chamber that merges into a coaxial cavity of larger diameter; a charge-forming piston reciprocally arranged within said cavity and bore so as to be urged away from said combustion chamber by an explosion therein with the intermediate portion of said piston having a radial enlargement disposed in said cavity, said piston being formed with a passage through which fluid passes from said cavity to said combustion chamber; spring means interposed between said body and said radial enlargement constantly biasing said piston towards said combustion chamber with the underside of said radial enlargement abutting the radial shoulder defined between said bore and said cavity; a spring adjustment member on said body and extending into said cavity so as to abut said spring, said spring adjustment member being movable towards and away from said spring so as to vary the effective strength thereof, with the space between said spring adjustment member and said shoulder constituting a lubricant chamber; means on said body for introducing a lubricant into said lubricant chamber; impact absorbing material interposed between the underside of said radial enlargement and said radial shoulder; a stroke adjustment post on said body with its lower end engageable by the upper end of said piston, said post being movable towards and away from said piston so as to adjust the stroke thereof; a fluid-receiving member on said body connected to said conduit means so as to admit said fluid to said cavity; a first check valve on said piston that opens towards said combustion chamber so as to block flow through said passage except while said piston is moving away from said combustion chamber; and a second check valve interposed between said fluid-receiving member and said body and opening towards said cavity, said second check valve being biased towards a closed position so as to block flow into said cavity except while said piston is moving towards said combustion chamber.

7. Injection apparatus for injecting a fluid into the combustion chamber of an internal combustion engine, comprising: conduit means for said fluid; an injector body securable to said engine, said body being formed with a bore that extends away from said combustion chamber that merges into a coaxial cavity of larger diameter; a charge-forming piston reciprocally arranged within said cavity and bore so as to be urged away from said combustion chamber by an explosion therein with the intermediate portion of said piston having a radial enlargement disposed in said cavity, said piston being formed with a passage through which fluid passes from said cavity to said combustion chamber; spring means interposed between said body and said radial enlargement constantly biasing said piston towards said combustion chamber with the underside of said radial enlargement abutting the radial shoulder defined between said bore and said cavity; a spring adjustment sleeve member on said body and extending into said cavity so as to abut said spring, said spring adjustment member being movable towards and away from said spring so as to vary the effective strength thereof, with the space between said spring adjustment member and said shoulder constituting a lubricant chamber; means on said body for introducing a lubricant into said lubricant chamber; a fluid-receiving tube forming an upward continuation of said spring adjustment sleeve and connected to said conduit means so as to admit fluid to said cavity above said piston; a cap on said fluid receiving tube; a stroke adjustment post extending through said cap with its lower end engageable with the upper end of said piston, said post being movable towards and away from said piston so as to adjust the stroke thereof, said post also being formed with a passage effecting communication between said fluid-receiving tube and said cavity; and check valve means that open towards said combustion chamber for restraining flow through said piston passage except while said piston is moving away from said combustion chamber.

8. Injection apparatus for injecting a fluid into the combustion chamber of an internal combustion engine, comprising: conduit means for said fluid; an injector body securable to said engine, said body being formed with a bore that extends away from said combustion chamber that merges into a coaxial cavity of larger diameter; a charge-forming piston reciprocally arranged within said cavity and bore so as to be urged away from said combustion chamber by an explosion therein with the intermediate portion of said piston having a radial enlargement disposed in said cavity, said piston being formed with a passage through which fluid passes from said cavity to said combustion chamber; spring means interposed between said body and said radial enlargement constantly biasing said piston towards said combustion chamber with the underside of said radial enlargement abutting the radial shoulder defined between said bore and said cavity; a spring adjustment sleeve member on said body and extending into said cavity so as to abut said spring, said spring adjustment member being movable towards and away from said spring so as to vary the effective strength thereof, with the space between said spring adjustment member and said shoulder constituting a lubricant chamber; means on said body for introducing a lubricant into said lubricant chamber; a fluid-receiving tube forming an upward continuation of said spring adjustment sleeve and connected to said conduit means so as to admit fluid to said cavity above said piston; a cap on said fluid-receiving tube; a stroke adjustment post extending through said cap with its lower end engageable with the upper end of said piston, said post being movable towards and away from said piston so as to adjust the stroke thereof, said post also being formed with a passage effecting communication between said fluid-receiving tube and said cavity; a first check valve on said piston that opens towards said combustion chamber so as to block flow through said passage except while said piston is moving away from said combustion chamber; and a second check valve interposed between said fluid-receiving member and said body and opening towards said cavity, said second check valve being biased towards a closed position so as to block flow into said cavity except while said piston is moving towards said combustion chamber.

9. Injection apparatus for injecting a fluid into the combustion chamber of an internal combustion engine, comprising: conduit means for said fluid; an injector body securable to said engine, said body being formed with a bore that extends away from said combustion chamber that merges into a coaxial cavity of larger diameter; a charge-forming piston reciprocally arranged within said cavity and bore so as to be urged away from said combustion chamber by an explosion therein with the intermediate portion of said piston having a radial enlargement disposed in said cavity, said piston being formed with a passage through which fluid passes from said cavity to said combustion chamber; spring means interposed between said body and said radial enlargement constantly biasing said piston towards said combustion chamber with the underside of said radial enlargement abutting the radial shoulder defined between said bore and said cavity; a spring adjustment member on said body and extending into said cavity so as to abut said spring, said spring adjustment member being movable towards and away from said spring so as to vary the effective strength thereof, with the space between said spring adjustment member and said shoulder constituting a lubricant chamber; means on said body for introducing a lubricant into said lubricant chamber; impact absorbing material interposed between the underside of said radial enlargement and said radial shoulder; additional impact absorbing material interposed between said stroke, adjustment post and said piston; and check valve means that open towards said combustion chamber for restraining flow through said piston passage except while said piston is moving away from said combustion chamber.

10. Injection apparatus for injecting a fluid into the combustion chamber of an internal combustion engine, comprising: conduit means for said fluid; an injector body securable to said engine, said body being formed with a bore that extends away from said combustion chamber that merges into a coaxial cavity of larger diameter; a charge-forming piston reciprocally arranged within said cavity and bore so as to be urged away from said combustion chamber by an explosion therein with the intermediate portion of said piston having a radial enlargement disposed in said cavity, said piston being formed with a passage through which fluid passes from said cavity to said combustion chamber; spring means interposed between said body and said radial enlargement constantly biasing said piston towards said combustion chamber with the underside of said radial enlargement abutting the radial shoulder defined between said bore and said cavity; a spring adjustment member on said body and extending into said cavity so as to abut said spring, said spring adjustment member being movable towards and away from said spring so as to vary the effective strength thereof, with the space between said spring adjustment member and said shoulder constituting a lubricant chamber; means on said body for introducing a lubricant into said lubricant chamber; impact absorbing material interposed between the underside of said radial enlargement and said radial shoulder; additional impact absorbing material interposed between said stroke, adjustment post and said piston; a first check valve on said piston that opens towards said combustion chamber so as to block flow through said passage except while said piston is moving away from said combustion chamber; and a second check valve interposed between said fluid-receiving member and said body and opening towards said cavity, said second check valve being biased towards a closed position so as to block flow into said cavity except while said piston is moving towards said combustion chamber.

11. Injection apparatus for injecting a fluid into the combustion chamber of an internal combustion engine, comprising: conduit means for said fluid; an injector body securable to said engine, said body being formed with a bore that extends away from said combustion chamber that merges into a coaxial cavity of larger diameter; a charge-forming piston reciprocally arranged within said cavity and bore so as to be urged away from said combustion chamber by an explosion therein with the intermediate portion of said piston having a radial enlargement disposed in said cavity, said piston being formed with a passage through which fluid passes from said cavity to said combustion chamber; spring means interposed between said body and said radial enlargement constantly biasing said piston towards said combustion chamber with the underside of said radial enlargement abutting the radial shoulder defined between said bore and said cavity; a spring adjustment sleeve member on said body and extending into said cavity so as to abut said spring, said spring adjustment member being movable towards and away from said spring so as to vary the effective strength thereof, with the space between said spring adjustment member and said shoulder constituting a lubricant chamber; means on said body for introducing a lubricant into said lubricant chamber; a fluid-receiving tube forming an upward continuation of said spring adjustment sleeve and connected to said conduit means so as to admit fluid to said cavity above said piston; a cap on said fluid-receiving tube; a stroke adjustment post extending through said cap with its lower end engageable with the upper end of said piston, said post being movable towards and away from said piston so as to adjust the stroke thereof, said post also being formed with a passage effecting communication between said fluid-receiving tube and said cavity; impact absorbing material interposed between the underside of said radial enlargement and said radial shoulder; additional impact absorbing material interposed between said stroke, adjustment post and said piston; a first check valve on said piston that opens towards said combustion chamber so as to block flow through said passage except while said piston is moving away from said combustion chamber; and a second check valve interposed between said fluid-receiving member and said body and opening towards said cavity, said second check valve being biased towards a closed position so as to block flow into said cavity except while said piston is moving towards said combustion chamber.

12. Injection apparatus for injecting a fluid into the combustion chamber of an internal combustion engine, comprising: an injector body secured to said engine and formed with a cavity communicating with said combustion chamber; a charge-forming piston reciprocally arranged within said cavity so as to be urged away from said combustion chamber by an explosion therein, said piston being formed with passage means through which said fluid passes from said cavity into said combustion chamber; a directional nozzle formed on the end of said piston proximate said combustion chamber and in communication with said piston passage, said nozzle directing fluid from said passage towards a desired portion of said combustion chamber; an alignment member carried by said body and rotatably adjustable relative thereto; means keying said alignment member and piston against relative rotation while permitting axial movements therebetween; and check valve means that open towards said combustion chamber for restraining flow through said piston passage except while said piston is moving away from said combustion chamber.

13. Injection apparatus for injecting a fluid into the combustion chamber of an internal combustion engine, comprising: an injector body secured to said engine and formed with a cavity communicating with said combustion chamber; a charge-forming piston reciprocally arranged within said cavity so as to be urged away from said combustion chamber by an explosion therein, said piston being formed with passage means through which said fluid passes from said cavity into said combustion chamber; a directional nozzle formed on the end of said piston proximate said combustion chamber and in communication with said piston passage, said nozzle directing fluid from said passage towards a desired portion of said combustion chamber; an alignment member carried by said body and rotatably adjustable relative thereto; means keying said alignment member and piston against relative rotation while permitting axial movement therebetween; conduit means for said fluid; a fluid-receiving member on said body connected to said conduit means so as to admit said fluid to said cavity; a first check valve on said piston that opens towards said combustion chamber so as to block flow through said passage except while said piston is moving away from said combustion chamber; and a second check valve interposed between said fluid-receiving member and said body and opening towards said cavity, said second check valve being biased towards a closed position so as to block flow into said cavity except while said piston is moving towards said combustion chamber.

14. Injection apparatus for injecting a fluid into the combustion chamber of an internal combustion engine, comprising: conduit means for said fluid; an injector body securable to said engine, said body being formed with a bore that extends away from said combustion chamber that merges into a coaxial cavity of larger diameter; a charge-forming piston reciprocally arranged within said cavity and bore so as to be urged away from said combustion chamber by an explosion therein with the intermediate portion of said piston having a radial enlargement disposed in said cavity, said piston being formed with a passage through which fluid passes from said cavity to said combustion chamber; spring means interposed between said body and said radial enlargement constantly biasing said piston towards said combustion chamber with the underside of said radial enlargement abutting the radial shoulder defined between said bore and said cavity; a fluid-receiving member on said body connected to said conduit means so as to admit said fluid to said cavity; a directional nozzle formed on the end of said piston proximate said combustion chamber and in communication with said piston passage, said nozzle directing fluid from said passage towards a desired portion of said combustion chamber; an alignment ring in said cavity abutting the upper end of said spring; means interposed between said body and said alignment ring for effecting rotational adjustment of said ring relative to said body; means keying said alignment member and piston against relative rotation while permitting axial movement therebetween; and check valve means that open towards said combustion chamber for restraining flow through said piston passage except while said piston is moving away from said combustion chamber.

15. Injection apparatus for injecting a fluid into the combustion chamber of an internal combustion engine, comprising: conduit means for said fluid; an injector body securable to said engine, said body being formed with a bore that extends away from said combustion chamber that merges into a coaxial cavity of larger diameter; a charge-forming piston reciprocally arranged within said cavity and bore so as to be urged away from said combustion chamber by an explosion therein with the intermediate portion of said piston having a radial enlargement disposed in said cavity, said piston being formed with a passage through which fluid passes from said cavity to said combustion chamber; spring means interposed between said body and said radial enlargement constantly biasing said piston towards said combustion chamber with the underside of said radial enlargement abutting the radial shoulder defined between said bore and said cavity; a fluid-receiving member on said body connected to said conduit means so as to admit said fluid to said cavity; a directional nozzle formed on the end of said piston proximate said combustion chamber and in communication with said piston passage, said nozzle directing fluid from said passage towards a desired portion of said combustion chamber; an alignment ring in said cavity abutting the upper end of said spring; means interposed between said body and said alignment ring for effecting rotational adjustment of said ring relative to said body; a fluid-receiving member on said body connected to said conduit means so as to admit said fluid to said cavity; a first check valve on said piston that opens towards said combustion chamber so as to block flow through said passage except while said piston is moving away from said combustion chamber; and a second check valve interposed between said fluid-receiving member and said body and opening towards said cavity, said second check valve being biased towards a closed position so as to block flow into said cavity except while piston is moving towards said combustion chamber.

16. Injection apparatus for injecting a fluid into the combustion chamber of an internal combustion engine, comprising: an injector body secured to said engine and formed with a cavity communicating with said combustion chamber; a charge-forming piston reciprocally arranged within said cavity so as to be urged away from said combustion chamber by an explosion therein, said piston being formed with passage means through which said fluid passes from said cavity into said combustion chamber; impact absorbing material interposed between said piston and said body; a directional nozzle formed on the end of said piston proximate said combustion chamber and in communication with said piston passage, said nozzle directing fluid from said passage towards a desired portion of said combustion chamber; an alignment member carried by said body and rotatably adjustable relative thereto; means keying said alignment member and piston against relative rotation while permitting axial movement therebetween; and check valve means that open towards said combustion chamber for restraining flow through said piston passage except while said piston is moving away from said combustion chamber.

17. Injection apparatus for injecting a fluid into the combustion chamber of an internal combustion engine, comprising: an injector body secured to said engine and formed with a cavity communicating with said combustion chamber; a charge-forming piston reciprocally arranged within said cavity so as to be urged away from said combustion chamber by an explosion therein, said piston being formed with passage means through which said fluid passes from said cavity into said combustion chamber; impact absorbing material interposed between said piston and said body; a directional nozzle formed on the end of said piston proximate said combustion chamber and in communication with said piston passage, said nozzle directing fluid from said passage towards a desired portion of said combustion chamber; an alignment member carried by said body and rotatably adjustable relative thereto; means keying said alignment member and piston against relative rotation while permitting axial movement therebetween; conduit means for said fluid; a fluid-receiving member on said body connected to said conduit means so as to admit said fluid to said cavity; a first check valve on said piston that opens towards said combustion chamber so as to block flow through said passage except while said piston is moving away from said combustion chamber; and a second check valve interposed between said fluid-receiving member and said body and opening towards said cavity, said second check valve being biased towards a closed position so as to block flow into said cavity except while said piston is moving towards said combustion chamber.

18. Injection apparatus for injecting a fluid into the combustion chamber of an internal combustion engine, comprising: conduit means for said fluid; an injector body securable to said engine, said body being formed with a bore that extends away from said combustion chamber that merges into a coaxial cavity of larger diameter; a charge-forming piston reciprocally arranged within said cavity and bore so as to be urged away from said combustion chamber by an explosion therein with the intermediate portion of said piston having a radial enlargement disposed in said cavity, said piston being formed with a passage through which fluid passes from said cavity to said combustion chamber; a directional nozzle formed on the end of said piston proximate said combustion chamber and in communication with said piston passage, said nozzle directing fluid from said passage towards a desired portion of said combustion chamber; an alignment member carried by said body and rotatably adjustable relative thereto; means keying said alignment member and piston against relative rotation while permitting axial movement therebetween; spring means interposed between said body and said radial enlargement constantly biasing said piston towards said combustion chamber with the underside of said radial enlargement abutting the radial shoulder defined between said bore and said cavity; a spring adjustment member on said body and extending into said cavity so as to abut said spring, said spring adjustment member being movable towards and away from said spring so as to vary the effective strength thereof, with the space between said spring adjustment member and said shoulder constituting a lubricant chamber; means on said body for introducing a lubricant into said lubricant chamber; a fluid-receiving member on said body connected to said conduit means so as to admit said fluid to said cavity; and check valve means that open towards said combustion chamber for restraining flow through said piston passage except while said piston is moving away from said combustion chamber.

19. Injection apparatus for injecting a fluid into the combustion chamber of an internal combustion engine, comprising: conduit means for said fluid; an injector body securable to said engine, said body being formed with a bore that extends away from said combustion chamber that merges into a coaxial cavity of larger diameter; a charge-forming piston reciprocally arranged within said cavity and bore so as to be urged away from said combustion chamber by an explosion therein with the intermediate portion of said piston having a radial enlargement disposed in said cavity, said piston being formed with a passage through which fluid passes from said cavity to said combustion chamber; a directional nozzle formed on the end of said piston proximate said combustion chamber and in communication with said piston passage, said nozzle directing fluid from said passage towards a desired portion of said combustion chamber; an alignment member carried by said body and rotatably adjustable relative thereto; means keying said alignment member and piston against relative rotation while permitting axial movement therebetween; spring means interposed between said body and said radial enlargement constantly biasing said piston towards said combustion chamber with the underside of said radial enlargement abutting the radial shoulder defined between said bore and said cavity; a spring adjustment member on said body and extending into said cavity so as to abut said spring, said spring adjustment member being movable towards and away from said spring so as to vary the effective strength thereof, with the space between said spring adjustment member and said shoulder constituting a lubricant chamber; means on said body for introducing a lubricant into said lubricant chamber; a fluid-receiving member on said body connected to said conduit means so as to admit said fluid to said cavity; impact absorbing material interposed between said piston and said body; and check valve means that open towards said combustion chamber for restraining flow through said piston passage except while said piston is moving away from said combustion chamber.

References Cited in the file of this patent

UNITED STATES PATENTS

| 1,162,789 | Loane | Dec. 7, 1915 |

FOREIGN PATENTS

| 8,714 | Great Britain | Apr. 14, 1913 |
| 80,591 | Germany | Apr. 4, 1895 |